US008775069B1

(12) United States Patent
Kabel et al.

(10) Patent No.: US 8,775,069 B1
(45) Date of Patent: Jul. 8, 2014

(54) METHODS, SYSTEMS, AND DEVICES FOR CONDITION SPECIFIC ALERTS

(75) Inventors: Darrin W. Kabel, Overland Park, KS (US); Steven J. Myers, Edgerton, KS (US); Devon A. Rolf, Paola, KS (US)

(73) Assignee: Garmin Switzerland GmbH (CH)

( * ) Notice: Subject to any disclaimer, the term of this patent is extended or adjusted under 35 U.S.C. 154(b) by 0 days.

(21) Appl. No.: 11/746,922

(22) Filed: May 10, 2007

Related U.S. Application Data

(63) Continuation of application No. 10/665,802, filed on Sep. 18, 2003, now Pat. No. 7,386,392.

(51) Int. Cl.
*G01C 21/20* (2006.01)

(52) U.S. Cl.
USPC ........... 701/425; 701/409; 701/410; 701/411; 701/433; 340/944; 340/995.27

(58) Field of Classification Search
CPC ...... G01C 21/00; G01C 21/20; G01C 21/206; G01C 21/3423
USPC ......... 701/409–416, 418, 423, 425, 433, 435, 701/487, 532, 533, 538; 340/944, 340/995.1–995.14, 995.19, 995.2, 995.27
See application file for complete search history.

(56) References Cited

U.S. PATENT DOCUMENTS

| | | | |
|---|---|---|---|
| 3,886,487 A | 5/1975 | Walsh et al. | 367/92 |
| 4,323,992 A | 4/1982 | Tobin, Jr. | 367/108 |
| 4,340,936 A | 7/1982 | Mounce | 701/200 |
| 4,646,244 A | 2/1987 | Bateman et al. | 364/461 |
| 4,873,676 A | 10/1989 | Bailey et al. | 367/98 |
| 4,893,127 A | 1/1990 | Clark et al. | 342/386 |
| 5,220,507 A | 6/1993 | Kirson | 701/202 |
| 5,339,085 A | 8/1994 | Katoh et al. | 342/180 |
| 5,398,188 A | 3/1995 | Maruyama | 701/208 |
| 5,470,233 A * | 11/1995 | Fruchterman et al. | 434/112 |
| 5,543,789 A | 8/1996 | Behr et al. | 340/995.12 |
| 5,559,707 A | 9/1996 | DeLorme et al. | 701/200 |

(Continued)

FOREIGN PATENT DOCUMENTS

JP  2002-288800  10/2002

OTHER PUBLICATIONS

"Garmin: GNS 430," Accessed Apr. 2, 2002, http://www.garmin.com/products/gns430/.*

(Continued)

*Primary Examiner* — Khoi Tran
*Assistant Examiner* — Spencer Patton
(74) *Attorney, Agent, or Firm* — Samuel M. Korte; Mohammad M. Ali

(57) ABSTRACT

Systems, devices, and methods are provided for calculating a course for avoiding user identified criteria. A navigation device with route calculation capabilities includes a processor connected to an input and a memory that includes cartographic data and user identified criteria. A route calculation algorithm can be used to calculate a course between two or more waypoints based on the predefined user criteria of the cartographic data. Performing the route calculation algorithm includes analyzing the cartographic data with a preference for providing the course that identifies and avoids the user identified criteria. A display is connected to the processor and is capable of displaying the calculated route and cartographic data. The device is also adapted to dynamically analyze an area surrounding a present location for user identified criteria to avoid and display the results of the analysis.

49 Claims, 8 Drawing Sheets

(56) References Cited

U.S. PATENT DOCUMENTS

| | | | |
|---|---|---|---|
| 5,592,382 A * | 1/1997 | Colley | 701/207 |
| 5,635,924 A | 6/1997 | Tran et al. | 340/905 |
| 5,684,476 A | 11/1997 | Anderson | 340/988 |
| 5,872,526 A | 2/1999 | Tognazzini | 340/961 |
| 5,878,368 A * | 3/1999 | DeGraaf | 701/209 |
| 5,893,081 A | 4/1999 | Poppen | 705/400 |
| 5,999,882 A | 12/1999 | Simpson et al. | 702/3 |
| 6,055,478 A | 4/2000 | Heron | 701/213 |
| 6,061,629 A | 5/2000 | Yano et al. | 701/209 |
| 6,104,316 A | 8/2000 | Behr et al. | 340/995.12 |
| 6,198,428 B1 | 3/2001 | Sekine | 342/176 |
| 6,199,015 B1 | 3/2001 | Curtwright et al. | 701/213 |
| 6,279,851 B1 | 8/2001 | Huss et al. | 244/3.15 |
| 6,289,277 B1 * | 9/2001 | Feyereisen et al. | 701/528 |
| 6,314,370 B1 | 11/2001 | Curtright | 701/213 |
| 6,356,837 B1 | 3/2002 | Yokota et al. | 701/208 |
| 6,362,751 B1 | 3/2002 | Upparapalli | 340/995.19 |
| 6,381,538 B1 | 4/2002 | Robinson et al. | 701/211 |
| 6,385,538 B1 | 5/2002 | Yokota | 701/211 |
| 6,401,038 B2 | 6/2002 | Gia | 701/301 |
| 6,421,603 B1 | 7/2002 | Pratt et al. | 701/206 |
| 6,469,664 B1 * | 10/2002 | Michaelson et al. | 342/357.13 |
| 6,473,003 B2 | 10/2002 | Horvath et al. | 340/945 |
| 6,556,206 B1 | 4/2003 | Benson et al. | 345/473 |
| 6,574,551 B1 | 6/2003 | Maxwell et al. | 701/209 |
| 6,577,947 B1 | 6/2003 | Kronfeld et al. | 701/202 |
| 6,653,947 B2 | 11/2003 | Dwyer et al. | 340/970 |
| 6,654,689 B1 | 11/2003 | Kelly | 702/3 |
| 6,665,630 B2 | 12/2003 | Wei et al. | 702/155 |
| 6,734,808 B1 | 5/2004 | Michaelson et al. | 340/984 |
| 6,750,815 B2 | 6/2004 | Michaelson et al. | 342/357.13 |
| 6,826,472 B1 * | 11/2004 | Kamei et al. | 701/202 |
| 6,845,324 B2 | 1/2005 | Smith | 702/3 |
| 6,862,501 B2 | 3/2005 | He | 701/3 |
| 6,885,919 B1 | 4/2005 | Wyant et al. | 701/21 |
| 7,035,166 B2 | 4/2006 | Zimmerman et al. | 367/88 |
| 2001/0025222 A1 * | 9/2001 | Bechtolsheim et al. | 701/209 |
| 2002/0121989 A1 | 9/2002 | Burns | 340/901 |
| 2004/0003958 A1 | 1/2004 | Fujimoto et al. | 181/124 |
| 2004/0006423 A1 | 1/2004 | Fujimoto et al. | 701/201 |
| 2004/0102898 A1 * | 5/2004 | Yokota et al. | 701/210 |
| 2004/0243307 A1 * | 12/2004 | Geelen | 701/213 |
| 2005/0027442 A1 * | 2/2005 | Kelley et al. | 701/202 |
| 2006/0116814 A1 | 6/2006 | Milbert | 701/209 |

OTHER PUBLICATIONS

Garmin's StreetPilot III Owner's Manual and Reference Guide, p. 46, Jan. 2003.
C-Series Display Reference Manual, Raymarine UK, Mar. 2006.
GPSMAP 3600C/3010C Color Chartplotter, Garmin Ltd., 2004.
GPSMAP 206/2010 Chartplotters Owner's Manual and Reference Guide, Garmin Ltd., 2001.

\* cited by examiner

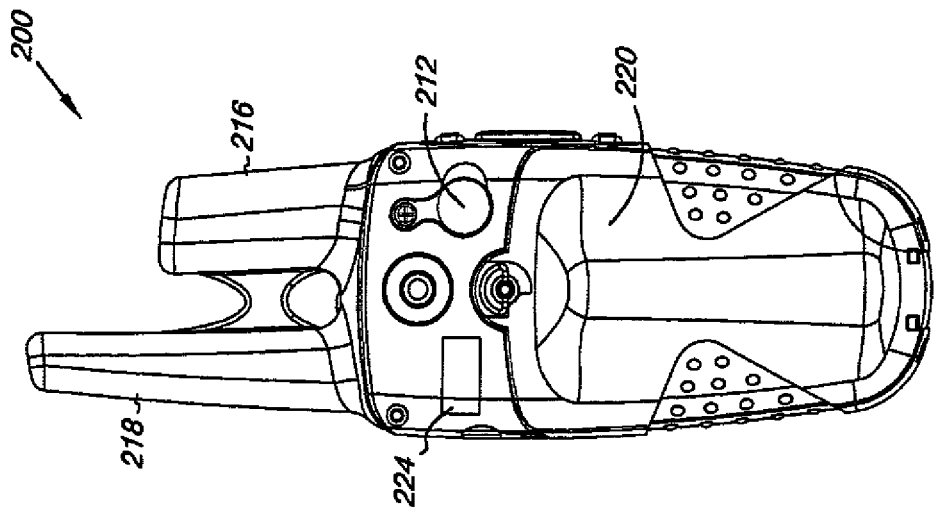
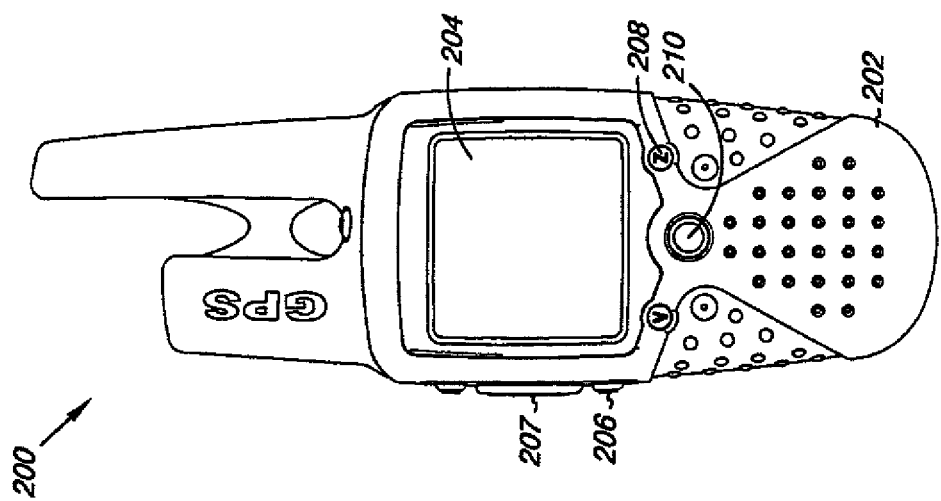
Fig. 2B
Fig. 2A

METHODS, SYSTEMS, AND DEVICES FOR CONDITION SPECIFIC ALERTS

RELATED APPLICATIONS

The present application is a continuation and claims priority benefit of an earlier-filed U.S. patent application entitled "Methods, Systems, and Devices for Condition Specific Alerts", Ser. No. 10/665,802, filed Sep. 18, 2003. The above referenced application is incorporated herein by specific reference.

FIELD OF THE INVENTION

The present invention relates generally to alert methods, systems, and devices; and, more particularly, to global positioning system (GPS) based condition specific alert methods, systems, and devices.

BACKGROUND OF THE INVENTION

The Global Positioning System (GPS) is a satellite-based navigation system made up of a network of 24 satellites placed into orbit by the U.S. Department of Defense. GPS was originally intended for military applications, but in the 1980s, the government made the system available for civilian use. GPS works in any weather conditions, anywhere in the world, 24 hours a day. There are no subscription fees or setup charges to use GPS.

GPS works using satellites that circle the earth twice a day in a very precise orbit and transmit signal information to earth. GPS receivers take this information and use triangulation to calculate the user's exact location. Essentially, the GPS receiver compares the time a signal was transmitted by a satellite with the time it was received. The time difference tells the GPS receiver how far away the satellite is. Now, with distance measurements from a few more satellites, the receiver can determine the user's position and display it on the unit's electronic map.

A GPS receiver must be locked on to the signal of at least three satellites to calculate a 2D position (latitude and longitude) and track movement. With four or more satellites in view, the receiver can determine the user's 3D position (latitude, longitude and altitude). Once the user's position has been determined, the GPS unit can calculate other information, such as speed, bearing, track, trip distance, distance to destination, sunrise and sunset time and more.

A GPS receiver can also be combined with navigation devices that provide mapping information. In these navigation devices, the location of the device, as determined by the GPS, is shown in relation to cartographic data, besides other type of data, on a display screen of the device. This cartographic data can be supplied to the navigation device through, for example, basemaps that are stored in the device. These basemaps contain data on major highways, thoroughfares, rivers, lakes, and borders, to name only a few of the possible cartographic features.

Navigation devices can also be used to calculate and provide a visual display of a course of travel between two or more waypoints. To accomplish this, a user can supply waypoint locations to the navigation device that calculates the course for the user. The navigation device can display the calculated course superimposed over a map that encompasses at least part of the calculated course.

Often times, however, the amount of information relating to the data contained in the basemaps used by the navigation device is not able to be fully displayed to the user. For example, a situation may arise where a calculated course is displayed having a relatively large map scale. In this situation, information that may be important to the user in considering whether to travel along the calculated course may not be made readily apparent. This type of information may include cartographic features such as the various grades (e.g., degree of slope) that would be encountered along the course, the type of terrain (e.g., rocky, sandy, hilly, unpaved) for the calculated course, and the presence of major obstacles (e.g., rivers, cliffs, gorges, swamps) along the calculated course. This type of situation may also arise when the calculated course is displayed having a relatively small map scale as well.

BRIEF DESCRIPTION OF THE DRAWINGS

FIG. 2A illustrates a front view of an embodiment of a navigation device.

FIG. 2B illustrates a rear view of the navigation device embodiment shown in FIG. 2A.

DETAILED DESCRIPTION

Embodiments of the present invention are drawn to navigation methods, systems, and devices having course calculation and analysis capabilities. The navigation methods, systems, and devices can use a number of techniques to determine positions and/or locations. For example, a navigation device can receive signals (e.g., radio signals) from which positional triangulation can be performed to determine positions and/or locations.

Embodiments further include a global positioning system (GPS) enabled navigation device as can be used for determining positions and/or locations. GPS is a satellite-based radio navigation system capable of determining continuous position, velocity, time, and in some instances direction information for an unlimited number of users. GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometric triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

Figure 1:
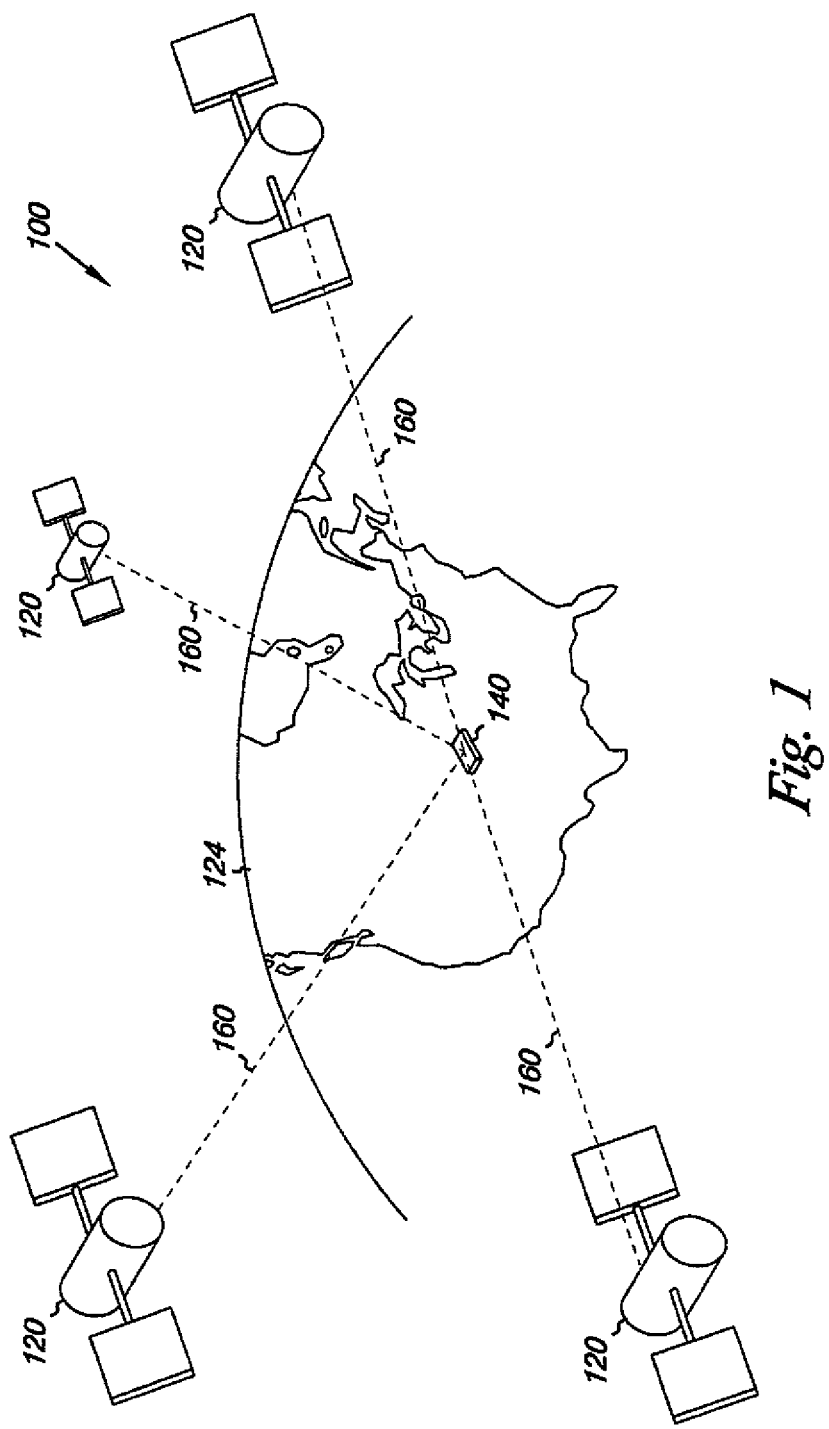
FIG. 1 is a representative view of a Global Positioning System (GPS).

FIG. 1 is representative of a GPS denoted generally by reference numeral 100. A plurality of satellites 120 are in orbit about the Earth 124. The orbit of each satellite 120 is not necessarily synchronous with the orbits of other satellites 120 and, in fact, is likely asynchronous. A GPS receiver device 140 of the present embodiment is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

FIGS. 2A and 2B illustrate views for one embodiment of a navigation device 200. Navigation device 200 can be portable and can be utilized in a number of implementations, including, but not limited to, marine, land, automobile and avionic navigation applications.

FIG. 2A illustrates a front view for an embodiment of the navigation device 200. Navigation device 200 can also be used as a stationary navigation device, where the device can be temporarily, or permanently, attached to one or more structures (e.g., a dashboard of an automobile, a boat, or a backpack).

As shown in the embodiment of FIG. 2A, navigation device 200 includes, but is not limited to, a protective housing 202 suitable to protect the device's internal structure, including electronics, in an air, land, or water environment. In the various embodiments, protective housing 202 includes a fully gasketed, high-impact strength plastic or plastic/alloy, waterproof case. This is but one example, and other protective housings 202 (e.g., metal or metal alloy) are considered within the scope of the present invention.

As shown in FIG. 2A, navigation device 200 includes a display 204. A number of displays can be suitable for use with the device. For example, in one embodiment, display 204 includes a liquid crystal display (LCD). Another example of display 204 includes, but is not limited to, a thin film display, a color display, or other suitable display. One example of a navigation device 200 includes the GPS navigation device sold under the trade designator eTrex, as manufactured by Garmin International, Inc. of Olathe, Kans. Embodiments of the present invention can also be used in other devices having positioning (e.g., GPS) capabilities.

In an additional embodiment, the navigation device 200 of the present invention can further include two-way voice communication capabilities (e.g., two-way radio or cellular communication) and capabilities for receiving weather alert broadcasts, such as those transmitted under the authority of the National Oceanic and Atmospheric Administration (NOAA). One example of a navigation device 200 having two-way voice communication capabilities includes a navigation/communication device sold under the trade designator RINO, as manufactured by Garmin International, Inc. of Olathe, Kans. The RINO is a global positioning system (GPS)-integrated Family Radio Service (FRS)/General Mobile Radio Service (GMRS) navigation device. Embodiments of the present invention can also be used in other devices having GPS and radio communication capabilities.

Display 204 is operable to present a number of different screen displays, examples of which are provided herein. The number of different screen displays include, but are not limited to, a map display, including a split-screen moving map; a map display with a "goto" point (e.g., a direct path to a selected destination), a track log (e.g., a previous path of travel that has been stored) and/or a course (e.g., a path to a destination consisting of intermediate stops along the way (waypoints, cities, highway exits, points of interest, intersections); address lookup for use with downloaded cartographic data of a map; a navigation display, including, for example, graphic compass, distance to destination, speed, and time of arrival prediction; point of interest display; listing of address display; trip computer display, including, for example, trip odometer, average and maximum speeds, travel time, and location; and waypoint display for setting waypoints or locations; and an altimeter display. The display 204 can further illustrate one or more cartographic maps, including a basemap, operable thereon to show lakes, rivers, cities, highways, streets, counties boundaries, and state boundaries.

As shown in FIG. 2A, the navigation device 200 includes a number of input devices, e.g., 206, 207, 208, and 210. The input devices shown include a power on/off button 206, a display screen button 207 to scroll through display screens, a display zoom control button 208 for changing the images on display screen 204, and/or a multiposition (e.g., 3-axis) data entry button 210 for use with display screen 204. Embodiments, however, are not limited to these examples. For example, in various embodiments, the display 204 can also receive data through a touch sensitive screen (e.g., screen can be responsive to use of a stylus and/or finger touch).

FIG. 2B is a rear view for an embodiment of navigation device 200. As shown in FIG. 2B, navigation device 200 includes a data port 212 operable to upload and download data between navigation device 200 and another electronic device, such as by using a USB connector or other suitable connection. In the various embodiments, the data port is operable to upload and download device software, and/or cartographic data. In various embodiments data can be uploaded and downloaded to navigation device 200 using a transceiver in navigation device 200 which can accommodate a wireless transmission medium such as, for example, infrared, Bluetooth, and/or Radio Frequency (RF) signals. Other transmission medium might also be used. Accordingly, the navigation device is provided with an RF antenna 218. As identified in FIG. 2B, the navigation device 200 further includes a GPS antenna 216.

In the embodiment of FIG. 2B, navigation device 200 includes a battery port 220 for housing batteries such as "AA" batteries and the like. Embodiments of the invention, however, are not so limited and an external power supply port can be operatively coupled to navigation device 200. Likewise, the various embodiments of the invention can include an electronic device having a data card slot, or data card port 224. Navigation device 200 can further include a mounting bracket (not shown) so that navigation device 200 can be selectably and removably mounted on a removable clip (e.g., belt clip) and/or other stationary surface.

The illustrations shown in FIGS. 2A and 2B are but one example of a hardware configuration for an electronic device according to the embodiments of the present invention. The invention is not limited to the embodiment shown in FIGS. 2A and 2B, and other configurations are considered within the scope of the present invention.

Figure 3:
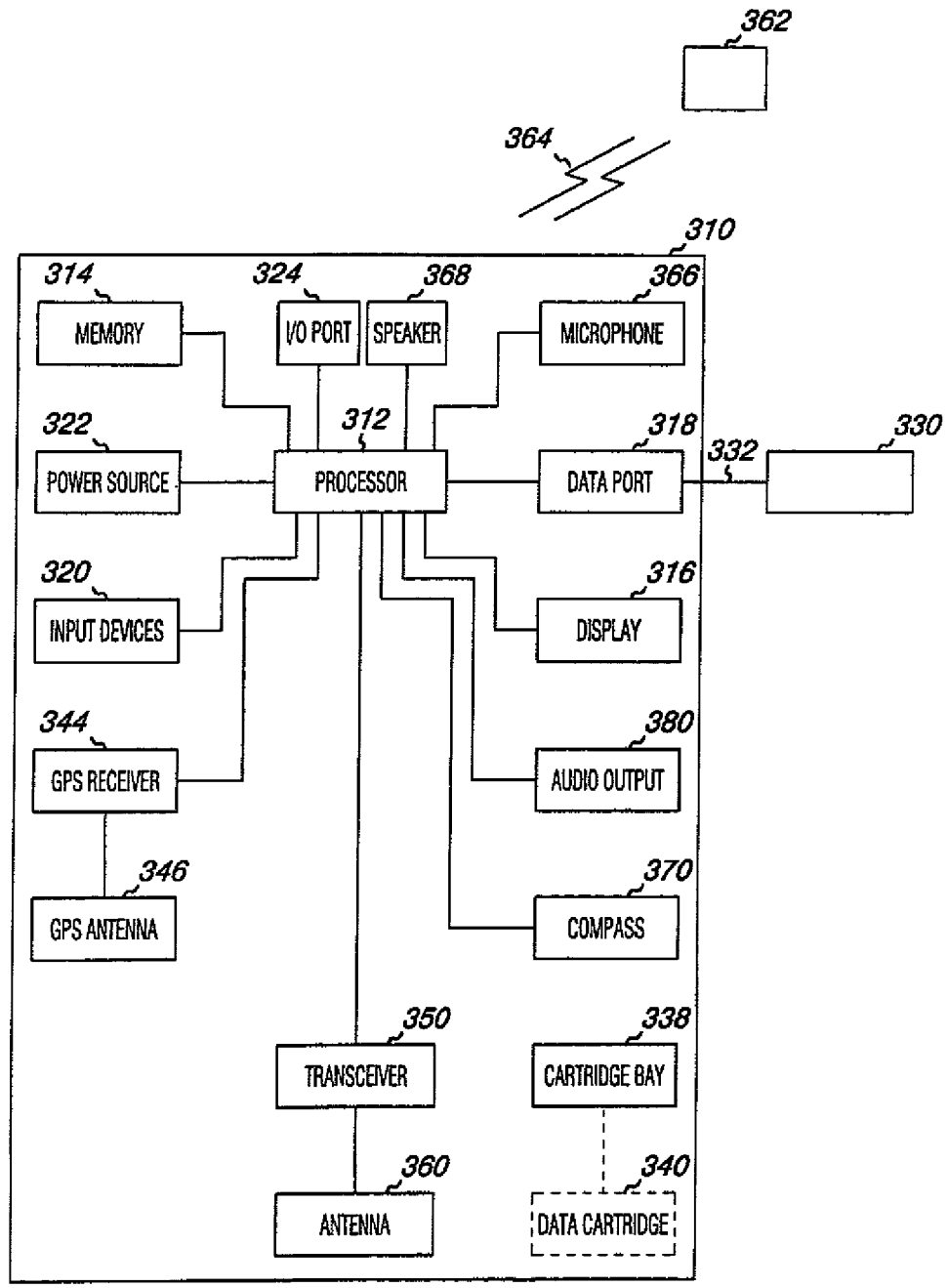
FIG. 3 is a block diagram of electronic components for one embodiment of a navigation device.

FIG. 3 is a block diagram of one embodiment for the electronic components associated with the present invention. The electronic components are discussed in connection with a navigation device 310, such as shown in FIGS. 2A and 2B. Embodiments of the invention, however, are not so limited. As shown in FIG. 3, navigation device 310 associated with the present invention can include a processor 312, a memory 314, a display 316, one or more data ports 318, an input 320, a power source 322 (e.g., batteries), and one or more I/O ports 324. The input 320 can include, but is not limited to, input devices such as those illustrated in connection with FIGS. 2A and 2B, e.g., the multiposition (e.g., 3-axis) data entry button 210. As shown in FIG. 3, the above components can operably communicate with one another.

Memory 314 can retrievably store instructions for executing one or more executable programs according to embodiments the present invention. In one example, the memory 314 can retrievably store a route calculation algorithm having computer executable instructions that can be operated on by various components of device 310 (e.g., processor 312). In addition, memory 314 can further retrievably store data, including, but not limited to, cartographic data and user identified criteria that are also used in conjunction with the route calculation algorithm.

User identified criteria can include parameters, and programmable values associated with the parameters, that are provided by the user and associated with geographical conditions of particular interest. For example, user identified criteria can include, but are not limited to, a predetermined grade (e.g., a degree of slope), a swamp, a lake, a river, a gorge, a cliff, ice, snow, stairs, a predetermined distance, a predetermined altitude, composition of path surface (e.g., gravel, dirt, blacktop, grass, rocky), non-wheelchair accessible, animal hazards, a terrain difficulty level, and prohibited areas, to name only a few. In one embodiment, the terrain difficulty level includes a generalized classification (e.g., "Difficult", "Moderate", and "Easier") of the nature of the geographical conditions that the user would like to avoid. For example, a classification of "Difficult" can be applied to a course having a path surface of sand and a predetermined grade of over 4% over 50% of the course. Other combinations of user identified criteria can be used in forming the generalized classifications.

In one embodiment, user identified criteria, and their associated value (or values) can be selected and programmed by the user through, for example, controlling one or more input menus on display 316 with the input 320 and/or through the I/O ports 324. In an additional embodiment, input 320 can receive additional cartographic data through input devices 206 (e.g., data entry button 210) and/or the display 316 from a user. This additional cartographic data can include waypoints (e.g., two or more waypoints, including potential waypoints), including a destination location, which can be used in calculating a course. In addition, input 320 can further receive coordinate positions for the waypoints. In one embodiment, input 320 can receive the coordinate positions for waypoints by inputs through the display 316. For example, input 320 can include an alphanumeric keypad, such as a telephone keypad, a microphone/voice recognition input, or touch screen, or a menu-driven display input which may be used to select and input a name or other identifier for the unit using a combination of the letters, numbers or symbols which are available on the device 310. In one example, the coordinate positions can be longitude and latitude coordinate positions.

Additionally, as shown in the embodiment of FIG. 3, data port 318 is operable to upload and download data between device 310 and another electronic device 330, such as a laptop computer, personal digital assistant (PDA), testing apparatus, cell phone, other intelligent appliance, or the like, via a communication link 332. Communications link 332 can include a hardwired or wireless communications link. Embodiments of the invention, however, are not so limited. For example, the information can be received from sources such as wired or wireless connections (e.g., infrared, Bluetooth, and/or Radio Frequency (RF) signals) employing public or proprietary interfaces and/or protocols.

As shown in FIG. 3, the various embodiments of device 310 include a data card slot, or data card port, cartridge bay or other receptacle of the like for receiving a data cartridge 340. Cartridge bay 338 and data cartridge 340 allow device 310 to access and utilize data stored on an external data cartridge. Data cartridge 340 can be used to transfer a wide range of data, including but not limited to cartographic data, avionics navigation data, automotive navigation data, marine craft navigation data, waypoints, and points of interest, to memory 314 of device 310.

As shown in the embodiment of FIG. 3, device 310 further includes a global positioning system (GPS) receiver 344 operably coupled to processor 312, memory 314 for handling GPS signals received by a GPS antenna 346. GPS receiver 344 and antenna 346 operate in conjunction with software, e.g. computer executable instructions, the processor 312, and the memory 314 to enable the device 310 to determine, or resolve, a position of the device 310. In some embodiments, a GPS operable with the navigation device 310 includes a wide area augmentation system (WAAS) capability that allows for even more precise location resolution, as the same will be known and understood by one of ordinary skill in the art.

In an additional embodiment, the navigation device 310 can further include the components for two-way voice data communication. For example, the navigation device 310 can further optionally include a transceiver 350 operatively coupled to an additional antenna 360. Transceiver 350 can be used to wirelessly transmit and receive voice data signals with other electronic devices 362 (e.g., another two-way radio device) through a communication channel 364. The functions of transceiver 350 may be accomplished with separate components (e.g., receiver and transmitter) operably coupled to processor 314 and the antenna 360.

Navigation device 310 can further optionally include a microphone 366 and a speaker 368 having associated amplifiers and circuitry, as the same will be known and understood by one of skill in the art, and be interfaced or coupled to processor 312 to facilitate two-way wireless voice data communication. The presences of components for two-way voice data communication are, however, optional as an embodiment of the present invention.

The voice data signals transmitted through communication channel 364 can be according to any particular communication technology and/or protocol. For example, the signals may be adapted to be used in cellular communication technology, such as time division multiple access (TDMA), frequency division multiple access (FDMA), code division multiple access (CDMA), global system for mobile communications (GSM), third generation (3G) GSM/CDMA, Family Radio Service (FRS), General Mobile Radio Service (GMRS), and the like. Both digital and analog signals may be transmitted through communication channel 364. According to various embodiments, these signals are modulated, encrypted and/or compressed signals as may be desirable for the communication technology.

In addition, processor 312 can execute a route calculation algorithm (e.g., a set of computer executable instructions) operable to calculate a course between two or more waypoints based on the user identified criteria of the cartographic data. The number of waypoints, for example, can be provided through input devices 320 and stored as cartographic data in memory 314. In one embodiment, the two or more waypoints (e.g., a starting point, which can include a present location of the device, and a destination point of a course) are determined and set by the user of the navigation device 310. Processor 312 can execute the route calculation algorithm to analyze cartographic data for the course to identify and avoid user identified criteria in the course between the two or more waypoints. The processor 312 can, if indicated according to the embodiments described herein, generate a signal for an alert signal based on the comparison.

In one embodiment, the present invention allows for a course to be calculated between waypoints, where cartographic data for the area between the waypoints can be analyzed to determine whether user identified criteria to avoid are present along the course being calculated. For example, processor 312 can operate on the route calculation algorithm to calculate a course between the two or more waypoints in view of user identified criteria of the cartographic data. So, for example, the processor 312 can operate on the route calculation algorithm to analyze the cartographic data to identify and avoid user identified criteria in the course being calculated between the two or more waypoints.

In an additional embodiment, the course calculated with the route calculation algorithm can also analyze a predetermined distance on either side of the calculated course for user identified criteria to avoid. In other words, a buffer zone around the calculated course can be analyzed for user identified criteria to avoid. In one embodiment, the predetermined distance can be automatically determined by the calculation algorithm based on the course being calculated. In an additional embodiment, the predetermined distance can be determined and programmed into the device by the user. The size of the predetermined distance can be influenced by a number of factors, including, but not limited to, the terrain over which the course is being calculated.

In calculating a course between two or more waypoints, the processor 312, using the route calculation algorithm, can re-calculate the course so as to provide a course that avoids the user identified criteria. So, in a situation where the processor 312 operating on the route calculation algorithm identifies user identified criteria in calculating a course, the processor 312 can continue to operate on the route calculation algorithm so as to avoid the user identified criteria by re-calculating the course so as to avoid the user identified criteria between the two or more waypoints. In one embodiment, in calculating and/or re-calculating the course to avoid the user identified criteria, the processor 312 can operate on the route calculation algorithm to identify one or more non-user waypoints between the two or more waypoints. In other words, the processor 312 can provide additional waypoints not indicated by the user (i.e., the non-user waypoints) in calculating the course to avoid the user identified criteria.

In an additional embodiment, there may be a situation where the processor 312 using the route calculation algorithm may be unable to calculate a course that completely avoids the user identified criteria. In this situation, it is possible that the processor 312 generates a signal for an alert signal that indicates that a course without the user identified criteria cannot be calculated for the two or more waypoints provided. A user can be prompted to provide additional and/or alternative waypoints for calculating a course. In an additional embodiment, the nature (e.g., the type) of the user identified criteria that would be present in the calculated course can be displayed for the user. The user can choose to accept, modify, or decline the calculated course having the user identified criteria.

In an additional embodiment, user identified criteria can also be assigned a ranking value by the user. The ranking value for each of the user identified criteria can be utilized in calculating the course. For example, user identified criteria that are the most relative importance to avoid (e.g., a cliff) may be assigned a high ranking value by the user, while user identified criteria having that are of less relative importance to avoid (e.g., stairs) may be assigned a low ranking value by the user. In the situation where the user identified criteria cannot be completely avoided, based on the waypoints provided, the processor 312 can execute the route calculation algorithm to calculate a course avoiding at least the high ranking value user identified criteria and as many of the low ranking value user identified criteria as possible.

In an additional embodiment, the processor 312 can execute a dynamic route analysis algorithm (e.g., a set of computer executable instructions) operable to analyze cartographic data for a predetermined area around a present location of the device for the presence of user identified criteria to avoid. This analysis feature for the presence of user identified criteria can be used in conjunction with or without a calculated course, as described herein. This dynamic analysis feature of the present embodiment allows for a user to be made aware of user identified criteria that may be in the vicinity, but not necessarily along a calculated course, of the present location and/or the course along which the device is traveling. In this way, the user will better understand the nature of the area surrounding the calculated course and/or the present location with respect to the user identified criteria.

In one embodiment, the processor 312 can utilize GPS antenna 346 and GPS receiver 344 to determine a present location value based on received GPS signals. The present location value can be determined regardless of whether the device is being transported along a calculated course or not. Processor 312 can dynamically analyze cartographic data for the predetermined area around the present location value for user identified criteria to avoid. The predetermined area around the present location value for analysis can have a preselected size and shape relative to the present location. For example, the preselected shape can include, but not limited to, circular, square, rectangular, polygonal, triangular, and/or radii. In addition, the area to be analyzed can be refreshed at a preselected rate so as to ensure that the present location value does not move out of the analyzed area prior to the analysis being refreshed.

In one embodiment, the predetermined area to be dynamically analyzed can include an area defined by radii (e.g., triangular and sector of a circle) extending along, for example, a course or a heading (discussed herein) from the present location, where the size of the area analyzed can be a function of the speed and heading of the navigation device. In an additional embodiment, an angle for the radii emanating from the present location can be either set by the user or determined based on type and nature of the terrain over which the device is being used. The angle of the radii can be set so that the predetermined area can encircle the present location, where a radius of the predetermined area analyzed can be a function of the speed and heading of the navigation device. A number of shapes can be used for the area to be analyzed and the area can be selected based on the application of the analysis.

In an additional embodiment, the processor 312 can operate on a track log algorithm to record a track log based on a heading input. For example, the track log can be based on a series of the present location values determined by the processor 312 from signals received from the GPS. The device can also determine heading from the GPS capability of the device 310. The processor 312 can operate on a heading algorithm to determine a heading based on the track log, where an analysis algorithm is operated on by the processor 312 to analyze cartographic data of the heading for user identified criteria to avoid. In an alternative embodiment, the heading input can be based on an electronic compass signal from electronic compass 370. Processor 312 can generate the signal for the alert signal based on the result of the comparison. So, for example, processor 312 would generate the signal for the alert signal when the heading would take the device into and/or through an area containing user identified criteria.

The device 310 according to one embodiment of the present invention can also include one or more ways of providing an alert signal to the user of the device 310 when a user identified criteria is identified. For example, processor 310 can provide a signal for the alert signal when the analyzed cartographic data for the course and/or the predetermined area around the present location includes user identified criteria. In an additional example, processor 310 can provide a signal for the alert signal in a situation where the processor 312 is unable to calculate a course that avoids user identified criteria.

In a further embodiment, the device 310 can further include an audio output device 380 coupled to processor 312 to audibly present the alert signal. For example, the device 310 can include a speaker, including associated amplifiers and circuitry, for providing the audio alert signal. In an additional embodiment, the alert signal can be graphically presented on display 316 under the control of processor 312. In one embodiment, graphically presenting the alert signal can include, for example, highlighting the calculated course and/or the analyzed area that includes the user identified criteria. This highlighting can include, but is not limited to, causing a change in the display color for the course (e.g., changing the calculated or track log course color to change from black to red, changing from a solid line to a broken or dashed line, and/or causing a line representing the course to flash on and off) or of the analyzed area (e.g., stippling the area, or a portion of the area, that includes the user identified criteria). In addition, the alert signal can also include text displayed on display 316 that indicates the user identified criteria and, optionally, indicators of their approximate locations relative to the course and/or the current position of the device. Different configurations of the components shown in FIG. 3 are considered within the scope of the various embodiments.

According to various embodiments of the present invention, an electronic device as described in connection with FIGS. 2A, 2B, and 3 can operate to allow for multiple displays screens having a variety of data to be presented to the user. In addition, input keys on the device can be used to input user identified criteria, including associated values, in addition to searching for and inputting predefined or user created waypoints such as, cities, highway exits, camp location, car location, boat location, boat launches, tide stations, and the like. Software is operable on the device to search for points of interest, street addresses, street intersection (crossroads), and the like. Such information can be viewable in different formats, including, e.g., by "name" (a list of every item available for a category) or by "nearest" (a list of only those items for a category that are nearby). Using the GPS capabilities of the device, the "nearest" list updates continuously.

Using the position location capabilities of the device (e.g., the GPS capabilities), a map page can graphically depict the device's position. For example, the device's position can be graphically depicted relative to landmarks, navigation aids, county and state boundary lines, lakes, rivers, coastlines, cities, and roadways (including highways and streets). In one embodiment, the device's present position can be indicated by a pointer symbol. In the various embodiments, a calculated course can appear on a cartographic or map presentation as a bold line. A track log(which shows where the device has been) can appear as a series of small points or dashes. In the various embodiments, the map display has a number of range scales, e.g. 20 feet to 800 miles (5 meters to 1200 kilometers). Other sizes are also possible. The map scale can be controlled by the input keys.

Using the embodiments of the present invention, the device is capable of calculating and analyzing a course between waypoints and/or dynamically analyzing cartographic data for a predetermined area for user identified criteria. Embodiments of the invention include a device that incorporates these and other functions as will be explained in more detail below in connection with FIGS. 4, 5, 6, 7, and 8.

FIGS. 4A through 4E, illustrate a number of display screen embodiments which are operable with various embodiments of the present invention. That is, software embodiments are operable to present data and provide various user interfaces on a display.

Figure 4A:
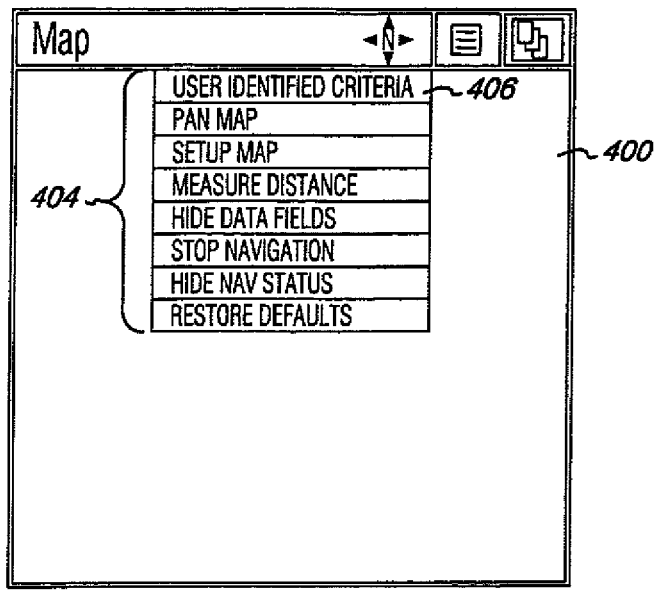
FIGS. 4A-4E illustrate a number of display screen embodiments which are operable with the navigation device.

For example, FIG. 4A provides a display 400 showing a selectable menu 404 having an operable link 406 to additional displays through which user identified criteria can be selected and values for the criteria entered into the device. Input 320 can be used to allow the selectable menu 404 with the operable link 406 to be displayed, and for identified criteria to be selected and values for the criteria entered into the device.

Figure 4B:
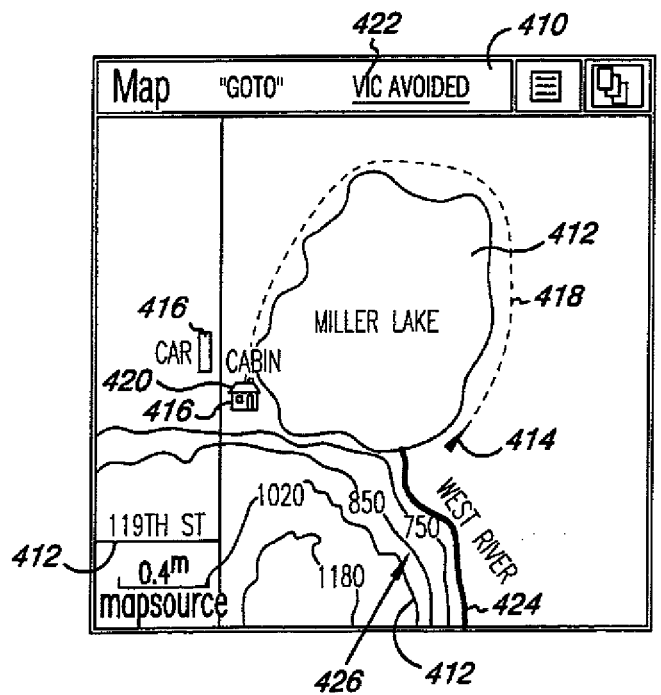

FIG. 4B provides a map display 410 that includes cartographic data 412 having, but not limited to, cities, streets, rivers, lakes, topographic data, and county and state borders, to name only a few. The displays can be accessed and displayed using selectable menus shown on a display screen and/or through use of input devices on the device. As shown, map display 410 can include present location 414, waypoints 416, and calculated course 418, along with the cartographic data 412.

The map display 410 illustrated in FIG. 4B further provides an embodiment of a "Goto" waypoint 420. In one example, the "Goto" waypoint 420 can be a selected position, such as a destination point for the user of the device, having one or more waypoints. In the present embodiment, the calculated course 418 is shown between the present location 414 and the "Goto" waypoint 420.

In one embodiment, the course to a "Goto" waypoint 420 is calculated to be as direct as possible (e.g., the shortest distance between the present location and the "Goto" waypoint 420). The embodiment of FIG. 4B, however, provides a situation in which certain user identified criteria were avoided in calculating course 418. Map display 410 can provide an indication 422 (e.g., "UIC Avoided") that certain user identified criteria were avoided in calculating course 418. In one embodiment, when the indication 422 is present the user can request additional information regarding the user identified criteria avoided in calculating the course through the map display 410.

In the embodiment shown in FIG. 4B, the user identified criteria in the present example include both rivers and a grade for the course of no greater than 2 percent. As the example illustrated in FIG. 4B shows, both a river 424 and a grade of greater than 2 percent, shown generally at 426, is located between the present location 414 and the "Goto" waypoint 420. As a result, the calculated course 418 provided by the device avoids these user identified criteria. It is also possible for the user to request a re-calculation of the course 418 through a menu displayed on the display screen to provide an alternate course between the present location and the "Goto" waypoint 420. Other mechanisms for requesting the re-calculation of course 418 are also possible. It is possible that one or more of the calculated courses can include user identified criteria (e.g., possibly having a lower ranking value). The calculated and requested re-calculated courses can be saved in the device for review by the user.

Figure 4C:
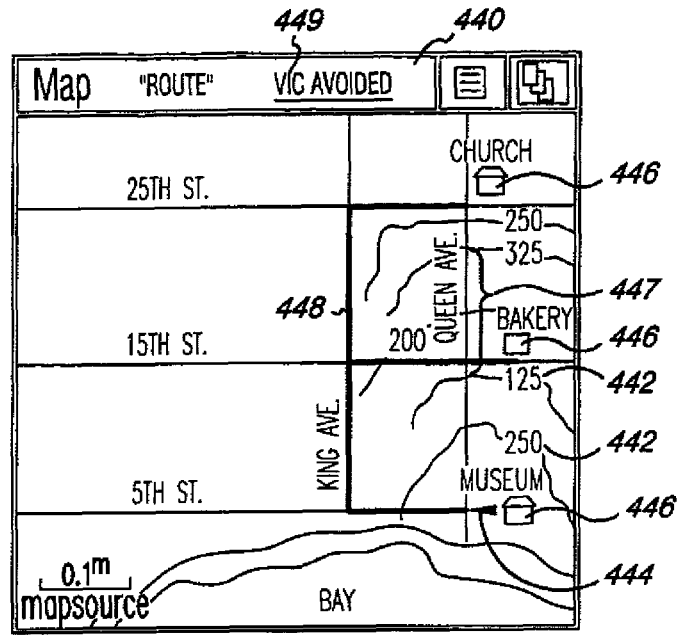

FIG. 4C provides a map display 440 of a route calculation that includes cartographic data 442 having, but not limited to, cities, streets, rivers, lakes, topographic data, and county and state boarders, to name only a few. As shown, map display 440 can include present location 444, waypoints 446, and calculated course 448, along with the cartographic data 442.

The map display 440 illustrated in FIG. 4C further provides an embodiment of calculating a course between two or more waypoints 446. In the present example, the course 448 has been calculated between a museum (e.g., a first waypoint), a bakery (e.g., a second waypoint), and a church (e.g., a third waypoint), where the waypoints 446 can be selected by the user using the inputs described above. FIG. 4C also provides an embodiment in which certain user identified criteria were avoided in calculating course 448. Map display 440 can also provide the indication 449 (e.g., "UIC Avoided") that certain user identified criteria were avoided in calculating course 448. In one embodiment, when the indication 449 is present the user can request additional information regarding the user identified criteria avoided in calculating the course through the map display 440.

In the embodiment shown in FIG. 4C, the user identified criteria in the present example includes both stairs and a grade for the course of no greater than 3 percent. As the example illustrated in FIG. 4C shows, a grade of greater than 3 percent is located between the waypoints 446 (e.g., the museum, the baker, and the church) at approximately 447 (change in altitude from 125 feet to 325 feet over a distance of about 0.1 miles along Queen Ave. between the bakery and the church, which provides a grade of about 38 percent). The presence of the stairs, however, has not been displayed, but has still been identified and considered in calculating course 448. The presence of the stairs in the area between the waypoints 446 can either be indicated by text on the display 440, or discovered by the user in requesting additional information about the indication 449 on the display 440. It is also possible for the user to request a re-calculation of the course 448 through a menu displayed on the display screen to provide an alternate course between the waypoints 446. Other mechanisms for requesting the re-calculation of course 448 are also possible. For example, it is possible that one or more of the calculated courses can include user identified criteria (e.g., possibly having a lower ranking value). The calculated and requested re-calculated courses can be saved in the device for review by the user.

Figure 4D:
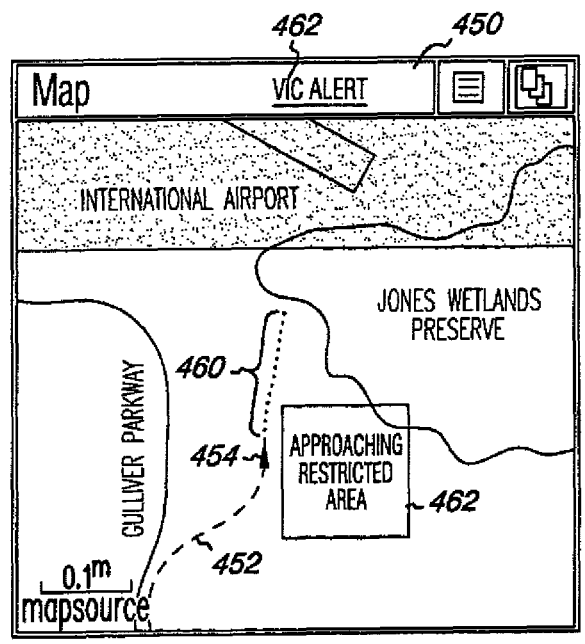

FIG. 4D provides an embodiment of a map display 450 in which a track log (shown with a broken line 452) for the device is being recorded. In one embodiment, the track log 452 can be based on one or more positions of the device as determined from GPS signals. Alternatively, the track log can be based on heading data from an electronic compass signal. Based on the track log, a heading 460 (shown with a dotted line) from the present location 454 can be calculated. In one embodiment, the heading provides an estimation of the path along which the device will most likely travel based upon available cartographic data (e.g., highways, streets, topographic constraints). When heading 460 crosses user identified criteria (in this example a restricted area) the display 450 provides an alert signal 462.

Figure 4E:
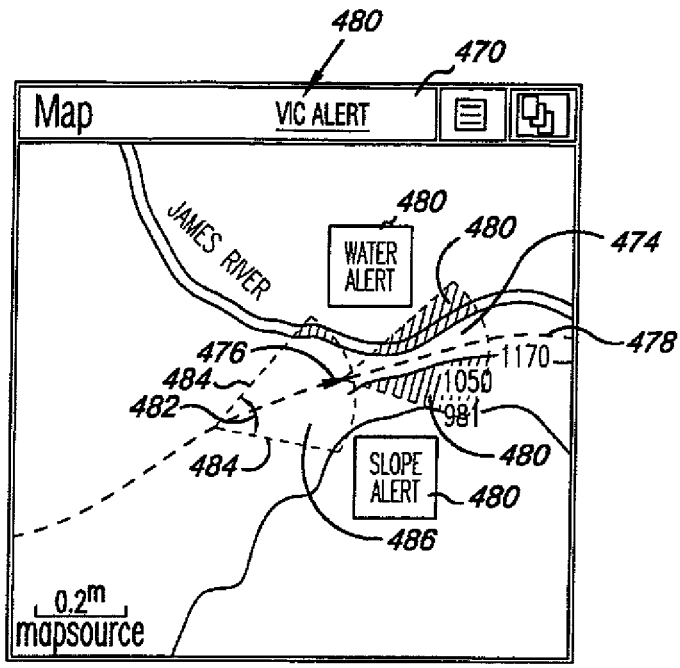

FIG. 4E provides an additional embodiment of a map display 470 where cartographic data is being dynamically analyzed for user identified criteria to avoid in a predetermined area 474 around a present location 476. In the embodiment shown in FIG. 4E, the cartographic data of the predetermined area 474 is dynamically analyzed for user identified criteria to avoid. In the present example, an alert signal 480 for at least one user identified criteria within the predetermined area 474 is shown in FIG. 4E.

In the present embodiment, the alert signal 480 is provided as a highlighted area that contains the one or more user identified criteria. The alert signal can include a combination of visual, audio, and/or mechanical alerts, as described herein. For example, one or more text messages may be presented on the display 470 in connection with the alert signal 480. In addition, the user may interact with the device to request further information regarding the alert signal 480. When more than one alert signal is present on a display, each alert signal can be identified by a unique designator (e.g., a number) for which the user can request additional information.

The predetermined area 474 can have a number of predetermined shapes. For example, the predetermined area 474 can include radii extending to form a sector of a circle from the present location 476. For example, the area defined by the sector of the circle can extend for a predetermined distance along a heading 478 (shown as a dotted line) from the present location 476. The heading 478 can be determined, for example, through the use of a track log. In addition, the size of the predetermined area can be determined based on a number of factors, including, but not limited to, the speed at which the device is traveling, track log information, and the nature of the terrain over which the device is traveling.

The radii extending to form the sector of the circle can also include an angle 482, as defined by line segments 484 emanating from the present location 476. The angle 482 and the line segments 484 emanating from the present location 476 help to define the predetermined area 474 of analysis. In addition, the angle 482 can have a selectable value of greater than 0 degrees to 360 degrees. In addition, the predetermined area 474 can have two equivalent areas on either side of a heading from the present location. In other words, the heading can bisect the angle of the predetermined area along a path the device is traveling. In an additional embodiment, the areas on either side of a heading of the device can be unequal. So, for example, the angle can include a selectable number of degrees (e.g., greater than 0 degrees to 180 degrees) to each side of the heading.

The predetermined area 474 to be analyzed can be refreshed at a preselected rate so as to ensure that the present location 476 does not move out of the current analyzed area (e.g., area 474) prior to the analysis being refreshed. In one embodiment, the present speed, average speed, and heading of the device can all be used in determining a refresh rate for analyzing subsequent predetermined area to ensure that the device does not move out of the predetermined area 474 prior to the analysis being refreshed. FIG. 4E also shows examples of previously analyzed areas 486, shown with, for example, broken lines. Other ways of representing the previously analyzed areas 486 are also possible, including not showing the previously analyzed areas.

The device can further, optionally, provide visual alerts to the encountered user identified criteria, audio to present the alert signal, and/or text messages displayed on the display that indicates the user identified criteria encountered in calculating the course and, optionally, indicators of their approximate locations along the course.

FIGS. 5-8 are block diagrams illustrating various method embodiments of the invention. Embodiments of the present invention include software, application modules, and computer executable instructions operable on the devices and systems described herein. The embodiments, however, are not limited to a particular operating environment. Nor is the software limited to software written in a particular programming language. Thus, embodiments of the invention include a set of instructions, e.g., software, executable by an information handling system. The software can reside on a free standing device as shown in FIGS. 2A and 2B and/or can, in some embodiments, be loaded, stored, and reside on a data cartridge.

Figure 5:
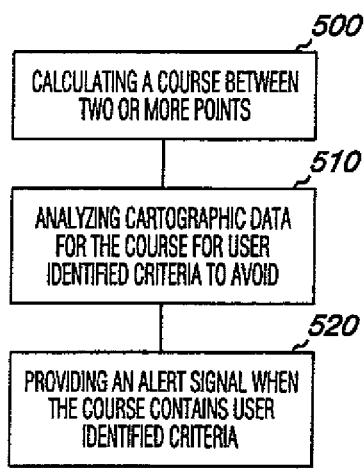
FIGS. 5-8 are block diagrams illustrating various method embodiments.

FIG. 5 is a block diagram illustrating one method embodiment. The method embodiments provided herein may be executed in a different order than that described herein. That is, elements of each method claim do not need to be executed in the order shown unless it is stated herein that such order is explicitly required.

As shown in FIG. 5, a method for generating an alert signal in a device is provided. The method includes calculating a course between two or more waypoints using the device at 500. In the various embodiments, calculating the course includes executing a route calculation algorithm to calculate the course between the two or more waypoints. In addition, calculating the course can further include calculating the course to avoid the user identified criteria between the two or more waypoints. At 510, the method further includes analyzing cartographic data for the course for user identified criteria to avoid. An alert signal can be provided at 520 when the calculated course contains user identified criteria.

In the various embodiments, calculating the course in view of the user identified criteria can be as described herein. For example, performing the route calculation algorithm can include analyzing cartographic data between the two or more waypoints, where the preference in performing the course calculation would be to avoid the user identified criteria. One approach to avoiding the user identified criteria includes re-routing the course to avoid the user identified criteria when the route calculation algorithm identifies one or more user identified criteria between the waypoints.

In re-routing the course calculated by the route calculation algorithm, the algorithm can further include identifying one or more non-user waypoints between the two or more waypoints. These non-user waypoints represent the waypoints identified by the device in re-routing the course. When a user identified criteria is identified in calculating the course, alert signals, can be provided to the user. Providing the alert signal can include displaying a visual alert and/or emitting an audio alert. Other alert signals are also possible, such as, for example, a mechanical alert (e.g., vibration of the device).

Figure 6:
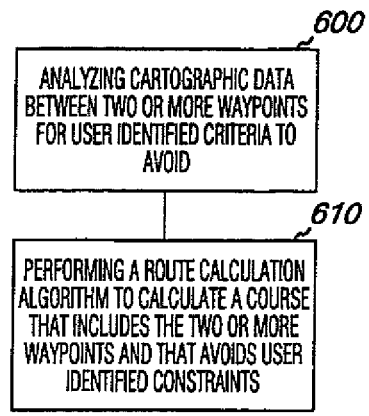

FIG. 6 is a block diagram illustrating another method embodiment. In FIG. 6, a method for calculating a course is provided. The method includes analyzing cartographic data between two or more waypoints for user identified criteria to avoid at 600. At 610, a route calculation algorithm can be performed to calculate a course that includes the two or more waypoints and that avoids user identified criteria.

The course can be re-calculated when initial calculations for the course contain user identified criteria. Re-calculation of the course to avoid the user identified criteria between the two or more waypoints can be in response to a user input. The method can further include providing an alert signal when the calculated course contains, or contained, user identified criteria. The alert signal can be used to generate a visual, an audio, and/or mechanical alert, as described herein.

The method can further provide dynamic analysis for user identified criteria along the course of travel. For example, a user's course of travel can proceed along a calculated course, as described herein. During the course of travel, the user's present location on the course can be determined using, for example, a signal from a global positioning system (GPS). Other charting tools may be used in addition to, or in place of, the GPS in determining a user's present location. A predetermined area around the present location can be dynamically analyzed for user identified criteria to avoid. For example, cartographic data for the predetermined area around the present location can be dynamically analyzed for user identified criteria to avoid. The area around the present location for analysis can have a preselected size and shape (e.g., triangular and sector of a circle) relative to the present location. In addition, the area to be analyzed can be refreshed at a preselected rate so as to ensure that the present location does not move out of the analyzed area prior to the analysis being refreshed.

Based on the dynamic analysis, alert signals can be provided to the user of the device when the analyzed cartographic data for the predetermined area around the present location includes user identified criteria. In one embodiment, the alert signal can be provided when the analyzed cartographic data for the course and/or the predetermined area around the present location includes user identified criteria. So, the alert signal would be provided when the analyzed cartographic data between the two or more waypoints included user identified criteria.

Figure 7:
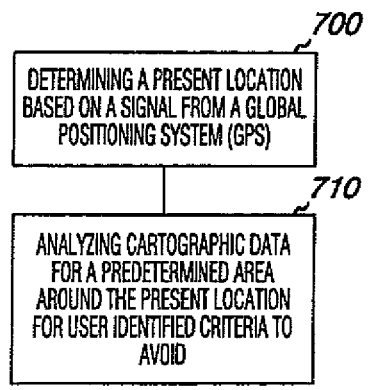

FIG. 7 is a block diagram illustrating another method embodiment. Again, the methods described herein can be performed with a set of computer readable instructions, e.g., program, storable on a computer readable medium. As shown in FIG. 7, a method embodiment includes determining a present location based on a signal from a global positioning system (GPS) at 700. Cartographic data for a predetermined area around the present location can be analyzed at 710 for user identified criteria to avoid.

In one embodiment, the analysis for user identified criteria includes dynamic analysis for user identified criteria along the course of travel. For example, a user's course of travel can proceed along a calculated course, as described herein. During the course of travel, the user's present location on the course can be determined using, for example, a signal from a global positioning system (GPS). As before, other charting tools may be used in addition to, or in place of, the GPS in determining a user's present location. A predetermined area around the present location can be dynamically analyzed for user identified criteria to avoid. For example, cartographic data for the predetermined area around the present location can be dynamically analyzed for user identified criteria to avoid. In addition, the area to be analyzed can be refreshed at a preselected rate so as to ensure that the present location does not move out of the analyzed area prior to the analysis being refreshed.

The area around the present location for analysis can have a preselected size and shape (e.g., triangular and sector of a circle) relative to the present location. In one embodiment, the predetermined area can be defined by radii extending from the present location. For example, radii can extend for a predetermined distance along the heading from the present location, such as a heading determined through the use of a GPS capability, a track log or an electronic compass. In addition, the size of the predetermined area can be determined based on a number of factors, including, but not limited to, the speed at which the device is traveling, track log information, and the nature of the terrain over which the device is traveling.

The area defined by the radii can also include an angle, as defined by the line segments emanating from the present location. The angle and the line segments emanating from the present location help to define the predetermined area of analysis. In addition, the angle can have a selectable value of greater than 0 degrees to 360 degrees. In addition, the predetermined area can have two equivalent areas on either side of a heading from the present location. In other words, the heading can bisect the angle of the predetermined area along a path the device is traveling. In an additional embodiment, the areas on either side of a heading of the device can be unequal. So, for example, the angle can include a selectable number of degrees (e.g., greater than 0 degrees to 180 degrees) to each side of the heading.

Based on the dynamic analysis, alert signals can be provided to the user of the device when the analyzed cartographic data for the predetermined area around the present location includes user identified criteria. In one embodiment, the alert signal can be provided when the analyzed cartographic data for the course and/or the predetermined area around the present location includes user identified criteria. So, the alert signal would be provided when the analyzed cartographic data between the two or more waypoints included user identified criteria.

Figure 8:
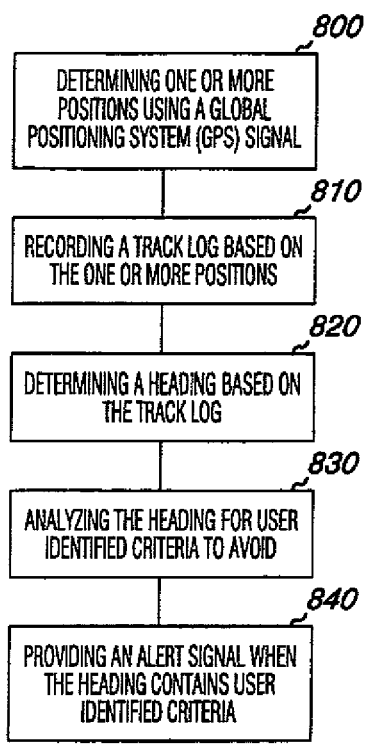

FIG. 8 is a block diagram illustrating another method embodiment. As shown in FIG. 8, a method embodiment includes determining a heading at 800. The heading can be determined in a number of manners. For example, the heading can be determined from an electronic compass signal. The heading can also be determined from one or more positions using a global positioning system (GPS) signal. The one or more positions can be used to record a track log. In some embodiments, a heading is determined from a track log. Embodiments, however, are not limited to these examples.

Cartographic data along the heading can be analyzed for user identified criteria to avoid at 810. The method further includes providing an alert signal, when the heading contains user identified criteria at 820. In the various embodiments, the method further includes performing a route calculation algorithm to calculate a course to avoid the user identified criteria. The course calculated to avoid the user identified criteria can be displayed to the user.

The method sequences shown in FIGS. 5 through 8 can be repeated, without limitation, in order to achieve a desired course. The analyzed cartographic data between the two or more waypoints can be stored in the memory of the device so as to be available for repeated attempts at calculating a course. Thus, embodiments include systems, devices and methods by which information concerning a course and/or a re-route calculation can be maintained.

According to various embodiments, calculating the re-route can include calculating the re-route with a preference for avoiding user identified criteria in a previous course. Thus, embodiments provide methods by which one or more course and/or re-route calculations can be performed to provide a course that best avoids user identified criteria.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising the steps of:
   determining, using a processor associated with a navigation device, a present location based on a signal from a global positioning system (GPS);
   receiving, using the processor, an input corresponding to a user identified criteria to be avoided, the user identified criteria being a hazard category;
   analyzing, using the processor, off-road cartographic data between the present location and a destination waypoint to determine if a geographic condition associated with the hazard category to avoid is present;
   calculating, using the processor, an off-road route to the destination waypoint based on the off-road cartographic data with a preference for avoiding all areas between the present location and the destination waypoint associated with the hazard category; and
   if the calculated off-road route avoids the hazard category, alerting a user regarding the avoidance of the hazard category using the processor;
   wherein the off-road cartographic data includes terrain information and information associated with bodies of water;
   wherein the terrain information includes various grades associated with a geographic area; and
   wherein the input corresponding to a hazard category to avoid is a maximum grade for a route to the destination waypoint.

2. The method of claim 1, wherein calculating the route includes identifying one or more non-user selected waypoints on the course.

3. The method of claim 1, further including using the processor to receive an input associated with a importance ranking of a plurality of user identified criteria and, if an area between the present location and the destination waypoint includes the user identified criteria, calculate a route based on the importance ranking.

4. The method of claim 1, wherein the off-road cartographic data further includes topographic data and street data.

5. The method of claim 1, wherein the off-road cartographic data associated with bodies of water includes coastlines.

6. A navigation device, comprising:
   a processor;
   a display operatively coupled to the processor;
   a global positioning system (GPS) receiver operatively coupled to the processor;
   an input device operable by a user to provide an input corresponding to a user identified criteria to be avoided, the user identified criteria being a hazard category;
   a memory operatively coupled to the processor, the memory having off-road cartographic data; and
   wherein the processor is operable to—
      determine a present location based on a signal received from the receiver, analyze cartographic data between the present location and a destination waypoint to determine if a geographic condition associated with the hazard category to avoid is present, calculate an off-road route to the destination waypoint based on the off-road cartographic data with a preference for avoiding all areas between the present location and the destination waypoint associated with the hazard category, and if the calculated off-road route avoids the hazard category, control the display to visually alert a user regarding the avoidance of the hazard category;

wherein the off-road cartographic data includes terrain information and information associated with bodies of water;

wherein the terrain information includes various grades associated with a geographic area; and wherein the input corresponding to a hazard category to avoid is a maximum grade for a route to the destination waypoint.

7. The navigation device of claim 6, wherein the processor operates on a track log algorithm to record a track log based on a series of the present location values, and operates on a heading algorithm to determine a heading based on the track log, wherein the processor further operates on an analysis algorithm to analyze cartographic data of the heading for the hazard category, and wherein the processor generates a signal for an alert signal when an area between the present location and the destination waypoint contains the hazard category.

8. The navigation device of claim 6, wherein the input device is further operable to be functioned by a user to provide an input corresponding to an importance ranking for a plurality of user identified criteria, wherein the processor is further operable to calculate a route based on the importance ranking.

9. The navigation device of claim 6, wherein the off-road cartographic data further includes topographic data and street data.

10. The navigation device of claim 6, wherein the off-road cartographic data associated with bodies of water includes coastlines.

11. A method comprising the steps of:
determining, using a processor associated with a navigation device, a present location based on a signal from a global positioning system (GPS);
receiving, using the processor, an input corresponding to a user identified criteria to be avoided, the user identified criteria being a hazard category;
analyzing, using the processor, off-road cartographic data between the present location and a destination waypoint to determine if a geographic condition associated with the hazard category to avoid is present;
calculating, using the processor, an off-road route to the destination waypoint based on the off-road cartographic data with a preference for avoiding all areas between the present location and the destination waypoint associated with the hazard category; and
if the calculated off-road route avoids the hazard category, alerting a user regarding the avoidance of the hazard category using the processor;
wherein the off-road cartographic data includes terrain information and information associated with bodies of water;
wherein a plurality of user identified criteria are received including two or more of a predetermined grade, a swamp, a lake, a river, a gorge, a cliff, ice, composition of path surface, non-wheelchair accessible, and a terrain difficulty level.

12. The method of claim 11, wherein calculating the route includes identifying one or more non-user selected waypoints on the course.

13. The method of claim 11, further including using the processor to receive an input associated with a importance ranking of a plurality of user identified criteria and, if the area includes the user identified criteria, calculate a route based on the importance ranking.

14. The method of claim 11, wherein the off-road cartographic data further includes topographic data and street data.

15. The method of claim 11, wherein the terrain information includes various grades associated with a geographic area.

16. The method of claim 11, wherein the off-road cartographic data associated with bodies of water includes coastlines.

17. A method comprising the steps of:
determining, using a processor associated with a navigation device, a present location based on a signal from a global positioning system (GPS);
receiving, using the processor, an input corresponding to a user identified criteria to be avoided, the user identified criteria being a hazard category;
analyzing, using the processor, off-road cartographic data between the present location and a destination waypoint to determine if a geographic condition associated with the hazard category to avoid is present;
calculating, using the processor, an off-road route to the destination waypoint based on the off-road cartographic data with a preference for avoiding all areas between the present location and the destination waypoint associated with the hazard category; and
if the calculated off-road route avoids the hazard category, alerting a user regarding the avoidance of the hazard category using the processor;
wherein the off-road cartographic data includes terrain information and information associated with bodies of water; and
wherein the off-road cartographic data further includes stair locations.

18. The method of claim 17, wherein calculating the route includes identifying one or more non-user selected waypoints on the course.

19. The method of claim 17, further including using the processor to receive an input associated with a importance ranking of a plurality of user identified criteria and, if the area includes the user identified criteria, calculate a route based on the importance ranking.

20. The method of claim 17, wherein the off-road cartographic data further includes topographic data and street data.

21. The method of claim 17, wherein the terrain information includes various grades associated with a geographic area.

22. The method of claim 17, wherein the off-road cartographic data associated with bodies of water includes coastlines.

23. A method comprising the steps of:
determining, using a processor associated with a navigation device, a present location based on a signal from a global positioning system (GPS);
receiving, using the processor, an input corresponding to a user identified criteria to be avoided, the user identified criteria being a hazard category;
analyzing, using the processor, off-road cartographic data between the present location and a destination waypoint to determine if a geographic condition associated with the hazard category to avoid is present;

calculating, using the processor, an off-road route to the destination waypoint based on the off-road cartographic data with a preference for avoiding all areas between the present location and the destination waypoint associated with the hazard category; and if the calculated off-road route avoids the hazard category, alerting a user regarding the avoidance of the hazard category using the processor;

wherein the off-road cartographic data includes terrain information and information associated with bodies of water; and wherein the input corresponding to a hazard category to avoid is a geographic area associated with a lake.

24. The method of claim 23, wherein calculating the route includes identifying one or more non-user selected waypoints on the course.

25. The method of claim 23, further including using the processor to receive an input associated with a importance ranking of a plurality of user identified criteria and, if the area includes the user identified criteria, calculate a route based on the importance ranking.

26. The method of claim 23, wherein the off-road cartographic data further includes topographic data and street data.

27. The method of claim 23, wherein the terrain information includes various grades associated with a geographic area.

28. The method of claim 23, wherein the off-road cartographic data associated with bodies of water includes coastlines.

29. A method comprising the steps of:
determining, using a processor associated with a navigation device, a present location based on a signal from a global positioning system (GPS);

receiving, using the processor, an input corresponding to a user identified criteria to be avoided, the user identified criteria being a hazard category;

analyzing, using the processor, off-road cartographic data between the present location and a destination waypoint to determine if a geographic condition associated with the hazard category to avoid is present;

calculating, using the processor, an off-road route to the destination waypoint based on the off-road cartographic data with a preference for avoiding all areas between the present location and the destination waypoint associated with the hazard category; and if the calculated off-road route avoids the hazard category, alerting a user regarding the avoidance of the hazard category using the processor;

wherein the off-road cartographic data includes terrain information and information associated with bodies of water; and wherein the input corresponding to a hazard category to avoid is a geographic area associated with a river.

30. The method of claim 29, wherein calculating the route includes identifying one or more non-user selected waypoints on the course.

31. The method of claim 29, further including using the processor to receive an input associated with a importance ranking of a plurality of user identified criteria and, if the area includes the user identified criteria, calculate a route based on the importance ranking.

32. The method of claim 29, wherein the off-road cartographic data further includes topographic data and street data.

33. The method of claim 29, wherein the terrain information includes various grades associated with a geographic area.

34. The method of claim 29, wherein the off-road cartographic data associated with bodies of water includes coastlines.

35. A navigation device, comprising:
a processor;
a display operatively coupled to the processor;
a global positioning system (GPS) receiver operatively coupled to the processor;
an input device operable by a user to provide an input corresponding to a user identified criteria to be avoided, the user identified criteria being a hazard category;
a memory operatively coupled to the processor, the memory having off-road cartographic data; and
wherein the processor is operable to—
determine a present location based on a signal received from the receiver,
analyze cartographic data between the present location and a destination waypoint to determine if a geographic condition associated with the hazard category to avoid is present,
calculate an off-road route to the destination waypoint based on the off-road cartographic data with a preference for avoiding all areas between the present location and the destination waypoint associated with the hazard category, and
if the calculated off-road route avoids the hazard category, control the display to visually alert a user regarding the avoidance of the hazard category;
wherein the off-road cartographic data includes terrain information and information associated with bodies of water; and
wherein the off-road cartographic data further includes stair locations.

36. The navigation device of claim 35, wherein the processor operates on a track log algorithm to record a track log based on a series of the present location values, and operates on a heading algorithm to determine a heading based on the track log, wherein the processor further operates on an analysis algorithm to analyze cartographic data of the heading for the hazard category, and wherein the processor generates a signal for an alert signal when the area between the present location and the destination waypoint contains the hazard category.

37. The navigation device of claim 35, wherein the input device is further operable to be functioned by a user to provide an input corresponding to an importance ranking for a plurality of user identified criteria, wherein the processor is further operable to calculate a route based on the importance ranking.

38. The navigation device of claim 35, wherein the off-road cartographic data further includes topographic data and street data.

39. The navigation device of claim 35, wherein the off-road cartographic data associated with bodies of water includes coastlines.

40. A navigation device, comprising:
a processor;
a display operatively coupled to the processor;
a global positioning system (GPS) receiver operatively coupled to the processor;
an input device operable by a user to provide an input corresponding to a user identified criteria to be avoided, the user identified criteria being a hazard category;
a memory operatively coupled to the processor, the memory having off-road cartographic data; and
wherein the processor is operable to—
determine a present location based on a signal received from the receiver, analyze cartographic data between the present location and a destination waypoint to determine if a geographic condition associated with the hazard category to avoid is present, calculate an off-road route to the destination waypoint based on the off-road cartographic data with a preference for avoiding all areas between the present location and the destination waypoint associated with the hazard category, and if the calculated off-road route avoids the hazard category, control the display to visually alert a user regarding the avoidance of the hazard category;

wherein the off-road cartographic data includes terrain information and information associated with bodies of water;

wherein the input corresponding to a hazard category to avoid is a geographic area associated with a lake.

41. The navigation device of claim 40, wherein the processor operates on a track log algorithm to record a track log based on a series of the present location values, and operates on a heading algorithm to determine a heading based on the track log, wherein the processor further operates on an analysis algorithm to analyze cartographic data of the heading for the hazard category, and wherein the processor generates a signal for an alert signal when the area between the present location and the destination waypoint contains the hazard category.

42. The navigation device of claim 40, wherein the input device is further operable to be functioned by a user to provide an input corresponding to an importance ranking for a plurality of user identified criteria, wherein the processor is further operable to calculate a route based on the importance ranking.

43. The navigation device of claim 40, wherein the off-road cartographic data further includes topographic data and street data.

44. The navigation device of claim 40, wherein the off-road cartographic data associated with bodies of water includes coastlines.

45. A navigation device, comprising:
a processor;
a display operatively coupled to the processor;
a global positioning system (GPS) receiver operatively coupled to the processor;
an input device operable by a user to provide an input corresponding to a user identified criteria to be avoided, the user identified criteria being a hazard category;
a memory operatively coupled to the processor, the memory having off-road cartographic data; and
wherein the processor is operable to—
determine a present location based on a signal received from the receiver, analyze cartographic data between the present location and a destination waypoint to determine if a geographic condition associated with the hazard category to avoid is present, calculate an off-road route to the destination waypoint based on the off-road cartographic data with a preference for avoiding all areas between the present location and the destination waypoint associated with the hazard category, and if the calculated off-road route avoids the hazard category, control the display to visually alert a user regarding the avoidance of the hazard category;

wherein the off-road cartographic data includes terrain information and information associated with bodies of water;

wherein the input corresponding to a hazard category to avoid is a geographic area associated with a river.

46. The navigation device of claim 45, wherein the processor operates on a track log algorithm to record a track log based on a series of the present location values, and operates on a heading algorithm to determine a heading based on the track log, wherein the processor further operates on an analysis algorithm to analyze cartographic data of the heading for the hazard category, and wherein the processor generates a signal for an alert signal when the area between the present location and the destination waypoint contains the hazard category.

47. The navigation device of claim 45, wherein the input device is further operable to be functioned by a user to provide an input corresponding to an importance ranking for a plurality of user identified criteria, wherein the processor is further operable to calculate a route based on the importance ranking.

48. The navigation device of claim 45, wherein the off-road cartographic data further includes topographic data and street data.

49. The navigation device of claim 45, wherein the off-road cartographic data associated with bodies of water includes coastlines.

\* \* \* \* \*